Patented July 26, 1932

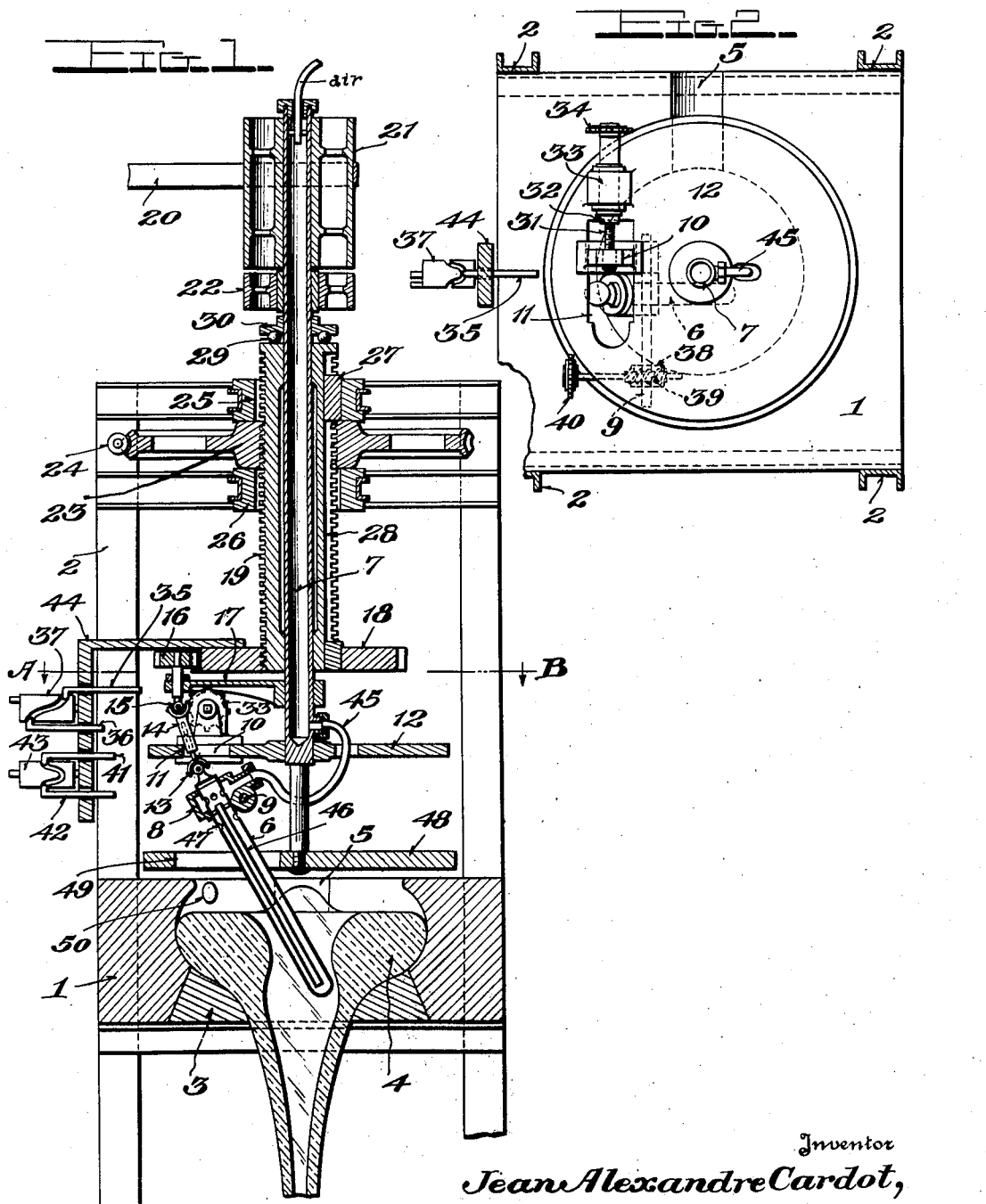

1,869,303

UNITED STATES PATENT OFFICE

JEAN ALEXANDRE CARDOT, OF BAGNEAUX SUR LOING, FRANCE, ASSIGNOR TO SOCIETE ANONYME LE PYREX, OF PARIS, FRANCE

PROCESS AND APPARATUS FOR THE MANUFACTURE OF RODS OR TUBES OF GLASS OR OTHER MATERIALS

Application filed February 15, 1930, Serial No. 428,717, and in France February 19, 1929.

My invention has for its object to provide a novel method for the drawing of tubes and canes of glass or other materials, by constituting a body of molten glass and by forming a cavity in it before drawing the glass. The exterior form of the glass body is given by the internal walls of a pot where is introduced the molten glass. The shaping of the cavity is realized by a suitable member rotating around the axis of the pot and arranged so that it can, at will, occupy, regulated positions with respect to the rotating axis without stopping the production.

The accompanying drawing shows, as example, a form of an apparatus which can be used for carrying out the process of the present invention.

Fig. 1 is a vertical axial section of this apparatus, the rotating member or calibre being represented in the plan containing the axis of the pot.

Fig. 2 is a plan section under the line A—B of the Fig. 1, the rotating member or calibre being supposed in a plan not containing the axis of the pot.

1 is the pot supported by the framework 2. This pot has a removable bottom 3 with a hole in its center.

The molten glass flows into the pot through the orifice 5, forming a body of glass 4 which is shaped internally by a rod or a tube 6 acting as a calibre and actuated by a vertical shaft 7 to rotate around the axis of the pot.

The calibre or member 6 is guided, at its superior part in a box 8 keyed on a horizontal shaft 9 which can turn in the carriage 10 slidable in the groove 11 of the platen 12 borne at the lower part of the shaft 7.

The tube 6 can rotate around its own axis by means of a driving mechanism composed of an articulated junction 13, a telescopic shaft 14, an articulated junction 15, a shaft bearing a pinion 16 and a member 17, fastened on the shaft 7, which makes this pinion running on a wheel 18 toothed inwardly or outwardly and fixed on a sleeve 19.

The shaft 7 has a rotating movement produced by a belt 20 which passes at will on a roller 21 or on an idler pulley 22, and a translating movement obtained by the sleeve 19 threaded and movable in the nut 23 actuated by the endless screw 24. This nut is placed between two guides 25 and 26 fixed on the framework 2.

The rotation of the sleeve 19 is empeded by a key 27, borne by the guide 25 and placed in the longitudinal groove 28 of said sleeve.

Balls 29, between the upper part of the sleeve 19 and the platen 30 fastened on the shaft 7, permit this shaft to rotate in the sleeve 19.

The form of the cavity of the glass body 4 varies with the height of the member 6, its distance from the shaft 7 and its inclination with regard to this shaft.

The height is regulated by the displacement of the sleeve 19, as said hereinabove, and consequently of the shaft 7 and the platen 12 wherein the carriage 10 with the horizontal shaft 9 and the box 8 carrying the rotating member 6 slides.

The distance between the member 6 and the shaft 7 is controlled by the sliding of the carriage 10 in the groove 11 by means of the screw 31 (Figure 2) and the nut 32 which can turn in a bearing 33 fixed on the platen 12. This rotation is effected by the fact that the teeth of the wheel 34 in connection with the nut 32 meet with one of the clicks 35 or 36 which can be moved, one in respect to the other, simultaneously in opposite direction, by means of a roll 37 with helicoidal grooves.

The inclination of the member 6 is determined by the horizontal shaft 9 bearing an helicoidal wheel 38 (Figure 2) wherein it can slide and which is actuated by an endless screw 39. The rotation of this screw is produced by the fact that the teeth of the wheel 40, in connection with the screw 39, meet with one of the clicks 41 or 42 which can be moved, one in respect to the other, simultaneously in opposite direction, by means of a roll 43 with helicoidal grooves.

The clicks and the rolls are placed on a bracket 44 fastened to the wheel 18.

The member 6 and the vertical shaft 7 are hollow and connected by a flexible tube 45 which conducts air in the interior of said member 6, for instance by means of a central conduct 46, the air being expelled by holes 47. The cooling can also be operated by another fluid such as water.

A screen 48, fastened to the shaft 7 and having a hole 49 for the passage of the member 6, protects the mechanism from the radiation of the molten glass in the pot.

The pot 1 is heated by burners 50 to maintain a suitable temperature in the glass body during the forming operations.

The drawing can be made by all known methods.

The advantages of the process and the apparatus hereinabove described reside in the possibility of varying, in course of working, the cavity of the glass body and consequently the dimensions of the final product, without necessity of stopping the flow of glass and the drawing. This variation is obtained, during the rotation of the shaft 7, by acting on the organs which regulate the height of the member 6, its distance from the shaft 7 and its inclination with respect to this shaft.

In this manner, by raising sufficiently the member 6, and giving it a suitable inclination and such a position that it is in the same plane as the axis of the shaft 7, without meeting it, the form of the interior of the glass body is closed at its bottom so that the glass drawn is a cylindrical rod. The lowering of the member 6 determines on the contrary the formation of a hollow cylinder having its diameter and its thickness regulated by the distance of the member 6 to the shaft 7 and its inclination with respect to this shaft.

It will be understood that the embodiments above indicated for the realization of the process of the present invention are given only as examples and that the forms, dimensions and arrangements of details may vary without modifying the principle of the invention.

Having thus described my invention what I claim as new and desire to secure by U. S. Letters Patent, is:

1. In an apparatus for drawing cylindrical tubes or rods of glass or other materials, a pot fed by molten glass and having a submerged orifice, a calibre to shape a cavity in the molten glass, a shaft moving the calibre around the vertical axis of the aperture, and having a translating movement along said axis, means for varying the positions of the calibre in respect to the shaft and means for rotating the calibre around its own axis.

2. In an apparatus for drawing cylindrical tubes or rods of glass or other materials, a pot fed by molten glass and having a submerged orifice, a calibre to shape a cavity in the molten glass, a shaft moving the calibre around the vertical axis of the aperture, and having a translating movement along said axis, means for varying the positions of the calibre in respect to the shaft, means for rotating the calibre around its own axis and means for cooling the interior of the calibre.

3. The method of drawing glass tubing which comprises superimposing a body of molten glass on an aperture and producing a cavity in the surface of the glass over the aperture by a member mounted eccentrically to and revolving around the vertical axis of the aperture.

4. The method of drawing glass tubing which comprises superimposing a body of molten glass on an aperture and producing a cavity in the surface of the glass over the aperture by revolving an inclined member around the vertical axis of the aperture.

5. In an apparatus for drawing glass tubes, the combination with a container for molten glass having an aperture in the bottom thereof, a member projecting below the level of the glass and having an axis displaced in respect to the vertical axis of the aperture, and means for revolving the member in respect to the vertical axis of the aperture.

6. In an apparatus for drawing glass tubes, the combination with a container for molten glass having an aperture in the bottom thereof, a member projecting below the level of the glass and having an axis displaced in respect to the vertical axis of the aperture, means for revolving the member in respect to the vertical axis of the aperture, and means for rotating the member around its own axis.

7. In an apparatus for drawing glass tubes, the combination with a container for molten glass having an aperture in the bottom thereof, a member projecting below the level of the glass and having an axis displaced in respect to the vertical axis of the aperture, means for revolving the member in respect to the vertical axis of the aperture, and means for varying the inclination of said member.

In testimony whereof I hereunto affix my signature.

JEAN ALEXANDRE CARDOT.